Patented Sept. 21, 1937

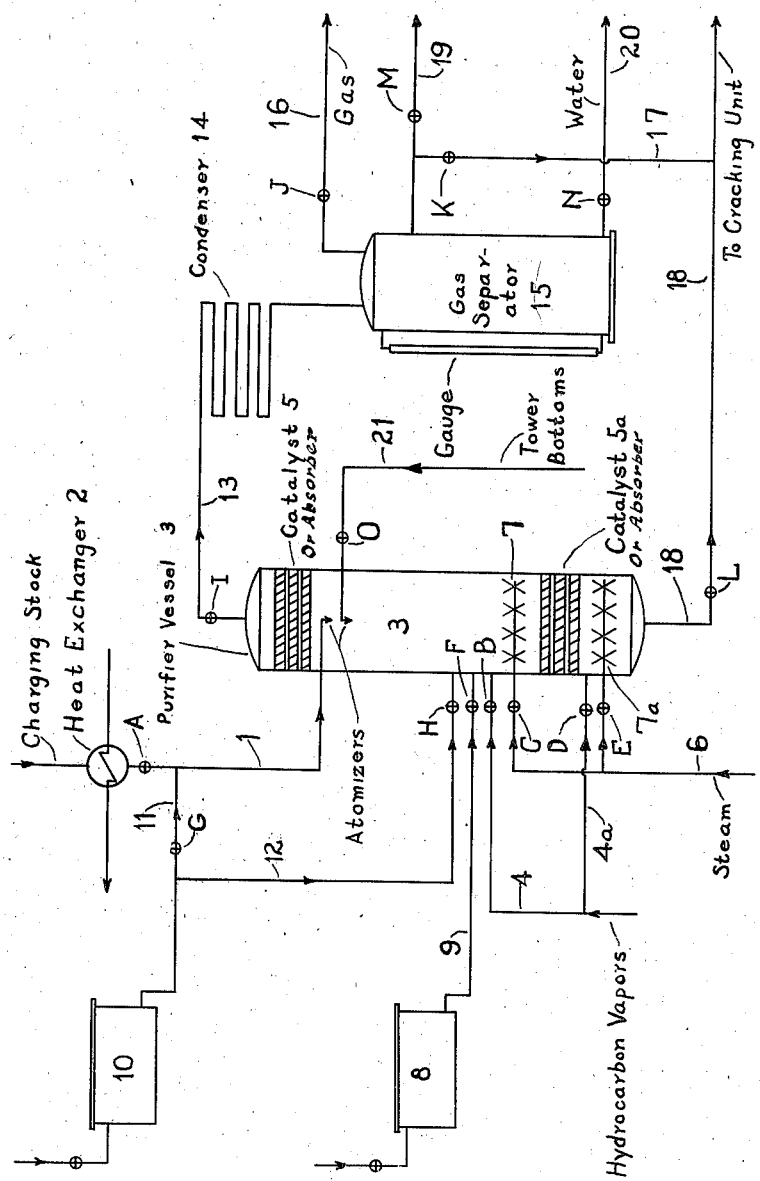

2,093,571

UNITED STATES PATENT OFFICE 2,093,571

PROCESS FOR PRODUCING A VALUABLE SYNTHETIC LIQUID HYDROCARBON PRACTICALLY FREE OF SULPHUR

Ernest A. Ocon, New York, N. Y.

Application April 15, 1935, Serial No. 16,290

12 Claims. (Cl. 196—25)

One of the most urgent problems in the oil industry has been to find a practical process to crack an initial hydrocarbon liquid material of relatively high sulphur content such as crude oil, topped oil, etc. In many instances the viscosity and sulphur content of the charging stock is so high that the cracking is not only difficult but costly.

Many processes have been suggested especially the so-called destructive hydrogenation processes, all operated under elevated pressures and it is well known that they are carried out with difficulty and at excessive costs in relation to their practical results.

This invention relates to the production of a valuable liquid synthetic hydrocarbon product that by cracking will produce high quality non-knocking low boiling point motor fuel of the gasoline range, free of tar and carbon reactions, and practically completely free of sulphur. The invention is also practical and effective for the removal of organic sulphur compounds from gases, e. g., water gas, natural gas, oil gas and the like.

In the preferred practices of the invention and as an initial step, the hydrocarbon charging stock to be desulphurized prior to cracking, is passed in an atomized or finely divided form into a confining elongated purifying vessel and subjected to a counter-current flow of hydrocarbon vapors and preferably to a flow of commingled hydrocarbon and water vapors, and simultaneously to the action of a suitable sulphur absorbent material passed into the vessel, such as ethylenediamine, $C_2H_4(NH_2)_2$, triethanolamine, $(C_2H_4OH)_3N$, or such as an alkali, e. g., ammonia, $(NH_3)$, followed by the action of specific metal catalysts immune to sulphur poisoning.

With certain classes of charging stock it will be advantageous to precipitate the products of decomposition of organic sulphur compounds with the formation of hydrogen sulphide by passing a reagent material such as ammonium sulphide, ammonium chloride, zinc chloride, and the like into the purifying vessel simultaneously with the charging stock. Tetrahydronaphathalene can be passed advantageously in solution with ethylenediamine or triethanolamine into the purifying vessel.

The proportion of reagent and absorbent materials to oil will depend upon the type of oil to be treated and will be passed into the purifier vessel in the form of vapors or atomized liquid.

The metal catalysts used are one or a compound of two or more oxides and/or sulphides selected from metals such as tungsten, nickel, chromium, molybdenum, aluminum, titanium, magnesium, calcium, cobalt, zinc and the like. Iron sulphides, particularly the heavy metal sulphides, will advantageously be added to the catalysts which may be in any desired form such as beads, rings, baffles, wire gauze or in the form of lumps, briquettes, blocks, and may be mixed to a binder such as lime, clay, cement, and the like, and/or may be added advantageously to the charging stock in a finely divided form. The purifying vessel itself may be of chrome-steel or chrome-nickel-iron alloy.

In this process the temperature or pressure within the purifying vessel may be varied, depending on the type of oil used, but temperatures insufficient to crack the mixed charging stock and hydrocarbon and water vapors during the purifying process are preferred. Atmospheric pressure or pressures of 20 or more, say 50 or 100 atmospheres can be employed, but as a rule, superatmospheric pressure and less than 20 atmospheres may be used. Generally, low pressures and not over 10 atmospheres are suitable to produce a valuable hydrocarbon product practically sulphur free and suitable for cracking.

The period of time that the charging stock is subjected to the purifying process is regulated by the velocity at which the vapors and liquid pass through their corresponding catalytic zones and may be in the order of seconds or minutes, but not in excess of ten minutes, the slower the velocity the longer the time the charging stock is subjected to the desulphurizing treatment and this will depend on the characteristics and sulphur content of the charging stock and the temperature and pressure employed. As a rule, the commingled light vapors and steam are subjected to contact with the catalysts for a shorter period of time than the liquid oil and other heavy fractions.

The hydrocarbon products, liquid and vapors, resulting after the desulphurizing treatment may be cracked jointly or separately, and/or may be allowed to separate and be subjected, if desired, to further purification with different catalysts and/or materials, e. g., caustic soda, sodium hydroxide, hypochlorite, lime, fuller's earth, and the like, then subjecting the essentially sulphur free liquid hydrocarbons of lower viscosity to cracking reactions, in liquid or vapor phase, with or without the use of hydrogen, steam and/or catalysts.

The purifying vessel or tower which may be one or a plurality of such structures and heated by the combined heat of the charging stock and injected hydrocarbon and water vapors may be insulated and if desired, additional heat may be applied by means of electric heaters or by any other suitable means to secure flexibility of operation and accurate control of temperature which may be varied in the two separate catalytic zones disposed within the purifying vessel.

The invention will be better illustrated by the accompanying drawing which shows one form of apparatus with a plurality of catalytic zones and in which the process may be carried into effect; although such apparatus and process are preferred they may be varied considerably as there are characteristics in structure and operation that makes my invention one having a broad form of application. For example, it is within the scope of my invention to apply or use with hydrocarbon oils of high sulphur content, under the operating conditions hereinafter described, a suitable reagent material to precipitate the products of decomposition of organic sulphur compounds with the formation of hydrogen sulphide, and simultaneously adding to the hydrocarbon oils a suitable sulphur absorbent material followed by the action of catalysts of the desulphurizing type.

In the following description and claims, the words "charging stock" mean a crude oil, topped oil, gas oil, tower bottoms and other condensates free of carbon and essentially free of tar, resulting from cracking oils, shale oil, liquefied coal, liquid hydrocarbons of semi-refined nature, such as kerosene or a mixed body of two or more of such hydrocarbons, and similarly the words "hydrocarbon vapors" mean fixed gas produced from cracking oil, water gas, and the like, and which are heated to a temperature above 300° F., but not in excess of 1000° F., generally 500 to 800° F., will suffice.

The charging stock after being heated by passing through a heat exchanger 2 or any other suitable heating means, to an incipient boiling temperature generally about 100 to 250° F., more or less, under superatmospheric pressure and below 10 atmospheres, is passed continuously into the purifying vessel 3, through pipe 1, controlled by valve A, simultaneously with highly heated hydrocarbon vapors supplied through pipe 4, controlled by valve B, and preferably jointly with highly heated water vapor supplied through pipe 6, controlled by valve C, and passed through steam spider 7. The light oil vapors released from the charging stock are commingled with a portion of the hydrocarbon and water vapors flowing upward through the catalysts 5, and the liquid drops to the bottom of the vessel 3, countercurrent during its passage through catalysts 5A, to an additional flow of hydrocarbon vapors passed into the lower part of vessel 3, through branch pipe 4A, controlled by valve D, and/or to additional water vapor passed through pipe 6, controlled by valve E, and supplied through spider 7A.

A sulphur absorbent material such as triethanolamine, $(C_2H_4OH)_3N$, ethylenediamine, $C_2H_4(NH_2)_2$, or an alkali, e. g., ammonia $(NH_3)$, is passed in atomized or finely divided form from tank 8 through pipe 9, controlled by valve F, into the purifier vessel 3, and if the charging stock is relatively high in sulphur content, a precipitating reagent material such as ammonium chloride, ammonium sulphide, zinc chloride and the like is passed from tank 10 through pipe 11, controlled by valve G, into the purifying vessel 3, jointly with the charging stock, or may be passed separately through pipe 12, controlled by valve H.

The commingled light oil vapors and water vapors that flow upwards in contact with catalysts 5, leave the purifying vessel 3, through pipe 13, controlled by valve I, and pass through condenser 14, into gas separator 15, from which any hydrogen sulphide that may be passed with the condensate is withdrawn through pipe 16, controlled by valve J, to an absorber or to a burner (connection not shown) or is released into the atmosphere.

The light condensed oil vapors, after their separation from the condensed water vapors and hydrogen sulphide gas, are withdrawn from tank 15, through pipe 17, controlled by valve K, and may be mixed with the charging stock of lower viscosity and lower sulphur content withdrawn from the bottom of purifying vessel 3, through pipe 18, controlled by valve L, and jointly subjected to cracking reactions, after the removal of any spent reagent formed during the desulphurizing process, or may be withdrawn from tank 15, through pipe 19, controlled by valve M, and subjected to a second vaporization and fractionation to produce an unusually high grade kerosene, illuminating oil and other valuable products of the desired boiling point range.

The condensed water vapors are withdrawn from tank 15, through pipe 20, controlled by valve N, and returned without substantial loss of heat to the vaporizing zone for re-use in the process or, if desired, may be treated with material such as silica gel, caustic soda, clay, lime and the like, prior its vaporization.

Tower bottoms and other condensates from cracked hydrocarbon oils from any suitable source and preferably admixed with oil of semi-refined nature such as kerosene are passed through pipe 21, controlled by valve O, into the purifying vessel 3, and advantageously subjected to the desulphurizing treatment and cracking reactions mixed with the charging stock.

Water or an emulsion of water and light oil of semi-refined nature is used as a carrier for the reagent and/or the sulphur absorbent materials supplied from tanks 10 and 8, and if desired, tower bottoms and water may be substituted as the carrier.

As an alternate process, the reagent and sulphur absorbent material may be mixed with the charging stock prior to its passage into vessel 3.

The apparatus in which the charging stock is subjected to the desulphurizing treatment preferably is constructed of material not liable to induce the formation of methane and deposition of coke, although the process may be carried out under incipient cracking temperature. The size of the apparatus, of course, will be subject to the conditions and quantities of charging stock to be continuously treated.

In the following claims the term "hot vaporous materials" means hydrocarbon vapors including water vapor. The temperature of the water vapor will range from 212° to not in excess of 800° F., generally having from 300 to 600° F.

Having described my invention, what I claim and desire to secure by Letters Patent, is as follows:—

1. A process for producing valuable synthetic hydrocarbon products relatively free of sulphur from high boiling point hydrocarbons which comprises, subjecting a preheated hydrocarbon charging stock to vaporization within a purifying zone under pressure of from atmospheric to 20 atmospheres, aiding vaporization of the charging stock by injecting into the purifying zone highly heated hydrocarbon vapors and steam having a temperature of from 300 to below 1000° F., fractionating the mixed products to separate vapors from liquids, subjecting the vapors to the action of sulphur absorbent materials selected from the group consisting of ethylene diamine, triethanolamine and ammonia, subjecting the thus treated vapors to the action of a desulphurizing catalyst selected from the class of metallic oxides and sulphides and withdrawing the treated vapors from the purifying zone.

2. A process for producing valuable synthetic hydrocarbon relatively free of sulphur from high boiling point hydrocarbon oils containing sulphur which comprises, subjecting a hydrocarbon charging stock and a liquid sulphur absorbent material selected from the group consisting of ethylene diamine, triethanolamine and ammonia to vaporization within a purifying zone aiding vaporization of the charging stock by injecting into the purifying zone highly heated hydrocarbon vapors and steam having a temperature of from 300 to below 1000° F., fractionating the mixed products to separate vapors from liquids, subjecting the vapors to the action of a desulphurizing catalyst selected from the class of metallic oxides and sulphides, withdrawing and condensing the thus treated vapors, separating the lighter fractions from spent material and chemical sludge, and subjecting the said lighter fractions to cracking reactions.

3. A process for cracking hydrocarbon oils containing sulphur to produce valuable synthetic products relatively free of sulphur and gum forming constituents which comprises, subjecting a hydrocarbon charging stock and a liquid sulphur absorbent material selected from the group consisting of ethylene diamine, triethanolamine and ammonia to vaporization within a purifying zone with the aid of hot hydrocarbon vapors and steam having a temperature of from 300 to below 1000° F., fractionating the mixed products to separate liquids from vapors, subjecting the vapors to the action of a desulphurizing catalyst selected from the class of metallic oxides and sulphides, withdrawing the treated vapors from the purifying zone, subjecting the liquid fractions to the action of a second desulphurizing catalyst selected from the class of metallic oxides and sulphides in the presence of additional water vapors, withdrawing the thus treated liquid fractions from the purifying zone and subjecting them to cracking reactions.

4. A process for producing valuable synthetic hydrocarbon products relatively free of sulphur and gum forming constituents from high boiling hydrocarbon oils containing sulphur which comprises, subjecting a hydrocarbon charging stock admixed with a desulphurizing reagent material to vaporization within a purifying zone with the aid of hot hydrocarbon vapors having a temperature of from 300 to 800° F., and water vapors having a temperature of from 212 to 800° F., fractionating the mixed products to separate vapors from liquids, subjecting the vapors to the action of a sulphur adsorbent body, subjecting the liquid fractions to the action of a second sulphur adsorbent body in the presence of additional hot hydrocarbon vapors and additional water vapors, and separately withdrawing the vapor and liquid fractions from the purifying zone and subjecting them separately to cracking reactions.

5. A process for producing valuable synthetic hydrocarbon products relatively free of sulphur and gum forming constituents from high boiling hydrocarbon oils containing sulphur which comprises, subjecting a hydrocarbon charging stock admixed with a liquid desulphurizing reagent to vaporization within a purifying zone with the aid of highly heated hydrocarbon vapors and water vapors having a temperature of from 300 to below 1000° F., fractionating the mixed products to separate vapors from liquids, subjecting the vapors to a spray of sulphur absorbent material selected from the group consisting of ethylene diamine, triethanolamine and ammonia, subjecting the liquids to the action of a desulphurizing catalyst selected from the class of metallic oxides and sulphides in the presence of additional water vapors, separately withdrawing the thus treated vapors and liquids from the purifying zone and subjecting said liquids to cracking reactions.

6. A process for producing valuable synthetic liquid hydrocarbon products relatively free of sulphur from high boiling hydrocarbon oils which comprises, subjecting a hydrocarbon charging stock to vaporization within a purifying zone with the aid of highly heated hydrocarbon vapors and steam having a temperature of from 300 to below 1000° F., and a pressure of from atmospheric to 20 atmospheres, fractionating the mixed products to separate vapors from liquids, subjecting the vapors to a spray of sulphur absorbent materials selected from the group consisting of ethylene diamine, triethanolamine and ammonia, subjecting the thus treated vapors to a desulphurizing catalyst selected from the class of metallic oxides and sulphides, subjecting the liquids to the action of a second desulphurizing catalyst selected from the class of metallic oxides and sulphides in the presence of additional highly heated hydrocarbon vapors, separately withdrawing said treated vapors and liquids from the purifying zone and subjecting the thus treated liquids to cracking reactions.

7. A process in accordance with claim 1, in which the hydrocarbon charging stock is subjected to vaporization jointly with clean tower bottoms comprising liquid products higher boiling than gasoline.

8. A process in accordance with claim 2, in which the hydrocarbon charging stock is subjected to vaporization jointly with clean tower bottoms comprising liquid products higher boiling than gasoline.

9. A process in accordance with claim 3, in which the condensed lighter fractions are subjected to cracking jointly with the liquid products withdrawn from the purifying zone.

10. A process in accordance with claim 4, in which the hydrocarbon charging stock is subjected to vaporization jointly with clean tower bottoms comprising liquid products higher boiling than gasoline.

11. A process in accordance with claim 5, in which the hydrocarbon charging stock is subjected to vaporization jointly with clean tower bottoms comprising liquid products higher boiling than gasoline.

12. A process in accordance with claim 6, in which the hydrocarbon charging stock is subjected to vaporization jointly with clean tower bottoms comprising liquid products higher boiling than gasoline.

ERNEST A. OCON.